United States Patent
Fujiwara

(10) Patent No.: US 11,163,047 B2
(45) Date of Patent: Nov. 2, 2021

(54) ULTRASONIC DIAGNOSTIC APPARATUS

(71) Applicant: Toshiba Medical Systems Corporation, Otawara (JP)

(72) Inventor: Shuta Fujiwara, Nasushiobara (JP)

(73) Assignee: Canon Medical Systems Corporation, Otawara (JP)

( * ) Notice: Subject to any disclaimer, the term of this patent is extended or adjusted under 35 U.S.C. 154(b) by 913 days.

(21) Appl. No.: 15/068,098

(22) Filed: Mar. 11, 2016

(65) Prior Publication Data
US 2017/0003385 A1 Jan. 5, 2017

(30) Foreign Application Priority Data
Jul. 3, 2015 (JP) .............................. JP2015-134526

(51) Int. Cl.
*G01S 7/52* (2006.01)

(52) U.S. Cl.
CPC ........ *G01S 7/52096* (2013.01); *G01S 7/5202* (2013.01)

(58) Field of Classification Search
CPC ....... G01S 7/52; G01S 7/52096; G01S 7/5202
See application file for complete search history.

(56) References Cited

U.S. PATENT DOCUMENTS

| | | | | |
|---|---|---|---|---|
| 3,373,602 A * | 3/1968 | Wendt | ................ | G01N 29/0618 310/336 |
| 5,456,256 A * | 10/1995 | Schneider | ............ | A61B 5/1172 600/445 |
| 6,530,887 B1 * | 3/2003 | Gilbert | ................ | G01S 7/52025 600/459 |
| 8,068,897 B1 * | 11/2011 | Gazdzinski | ........ | A61B 1/00016 600/109 |
| 9,554,773 B2 * | 1/2017 | Onishi | .................. | A61B 8/4444 |
| 2001/0051766 A1 * | 12/2001 | Gazdzinski | ........ | A61B 1/00016 600/309 |

(Continued)

FOREIGN PATENT DOCUMENTS

| | | |
|---|---|---|
| JP | 2002-306475 A | 10/2002 |
| JP | 2006-81730 A | 3/2006 |

OTHER PUBLICATIONS

Japanese Office Action dated Feb. 12, 2019 in Japanese Patent Application No. 2015-134526, citing documents AO and AP therein, 4 pages.

*Primary Examiner* — Isam A Alsomiri
*Assistant Examiner* — Amie M Ndure
(74) *Attorney, Agent, or Firm* — Oblon, McClelland, Maier & Neustadt, L.L.P.

(57) ABSTRACT

The ultrasonic diagnostic apparatus according to the embodiment includes regulator circuitry, transmission circuitry, and control circuitry. The regulator circuitry convert a power supply input in accordance with a driving pulse signal to generate an output signal. The transmission circuitry convert the output signal to a transmission pulse to drive a ultrasonic probe. The control circuitry generate a driving pulse signal to increase the output signal when allowing the transmission circuitry to generate a transmission pulse having a strength and/or a time width equal to or greater than a predetermined value, in comparison to when allowing the transmission circuitry to generate a transmission pulse having a strength and/or a time width equal to or less than the predetermined value.

9 Claims, 9 Drawing Sheets

(56) References Cited

U.S. PATENT DOCUMENTS

| | | | | |
|---|---|---|---|---|
| 2003/0047752 A1* | 3/2003 | Campbell | H01L 31/107 | 257/186 |
| 2003/0176787 A1* | 9/2003 | Gilbert | G01S 7/52063 | 600/437 |
| 2007/0083119 A1* | 4/2007 | Adachi | A61B 8/00 | 600/437 |
| 2007/0160540 A1* | 7/2007 | Nishigaki | G01S 7/52017 | 424/9.5 |
| 2007/0281379 A1* | 12/2007 | Stark | B81B 3/0021 | 438/50 |
| 2008/0289108 A1* | 11/2008 | Menkedick | A61G 7/0528 | 5/610 |
| 2010/0280379 A1* | 11/2010 | Satoh | A61B 8/14 | 600/447 |
| 2011/0121654 A1* | 5/2011 | Recker | H02J 7/0068 | 307/66 |
| 2012/0258802 A1* | 10/2012 | Weston | A63F 13/31 | 463/37 |
| 2013/0140989 A1* | 6/2013 | Shteynberg | H05B 45/20 | 315/113 |
| 2013/0303917 A1* | 11/2013 | Ona | B06B 1/0607 | 600/459 |
| 2013/0324852 A1* | 12/2013 | Onishi | A61B 8/4444 | 600/459 |
| 2013/0331699 A1* | 12/2013 | Ishihara | A61B 8/48 | 600/443 |
| 2014/0135628 A1* | 5/2014 | Amemiya | A61B 8/4444 | 600/459 |
| 2015/0231408 A1* | 8/2015 | Williams | A61N 5/06 | 607/88 |
| 2015/0301165 A1* | 10/2015 | Rothberg | G01S 7/52019 | 367/117 |
| 2020/0008474 A1* | 1/2020 | Soriano | A24F 47/008 | |
| 2020/0103889 A1* | 4/2020 | Celia | H04L 1/0002 | |
| 2020/0105125 A1* | 4/2020 | Haas | G08B 29/14 | |

\* cited by examiner

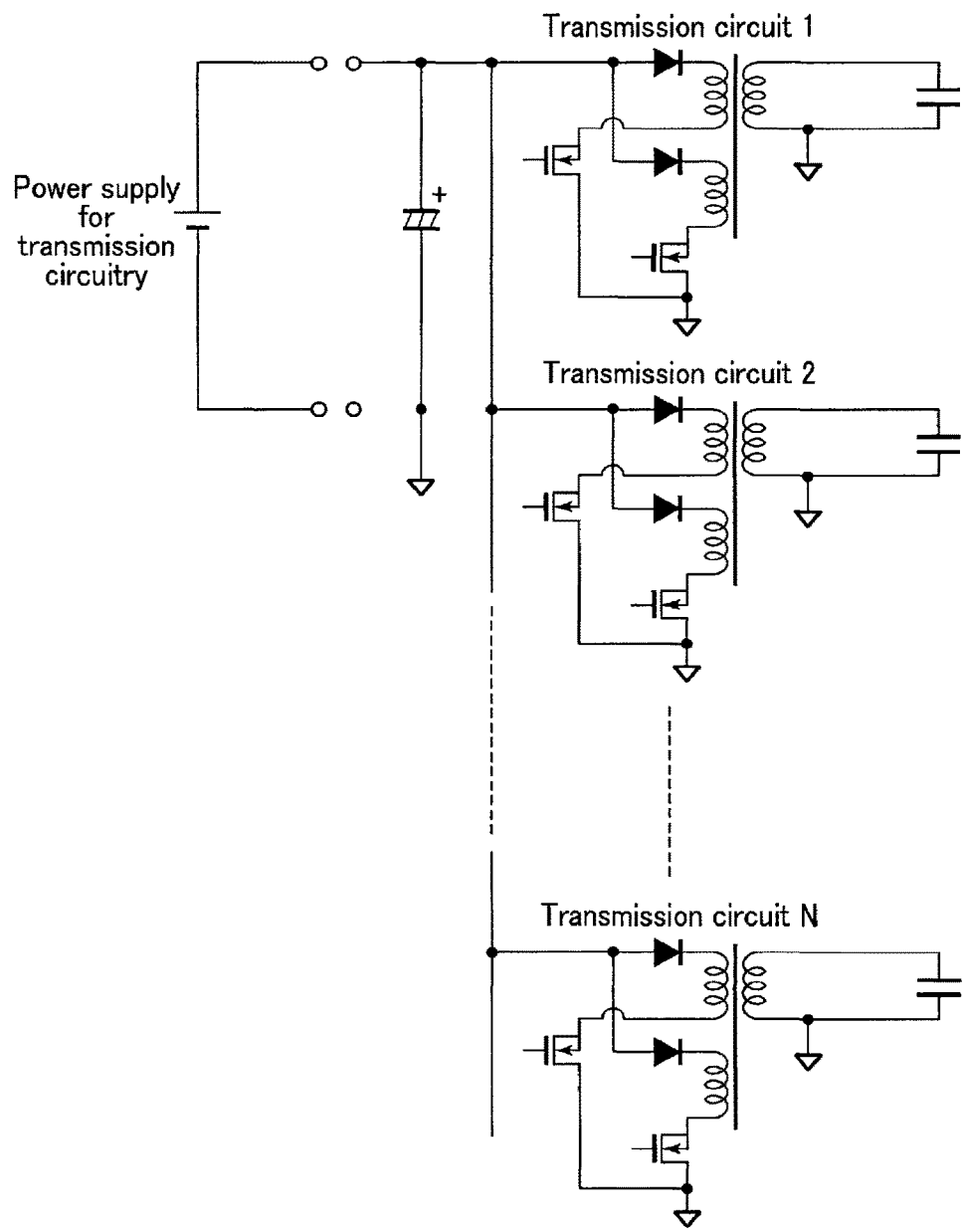
F I G. 2

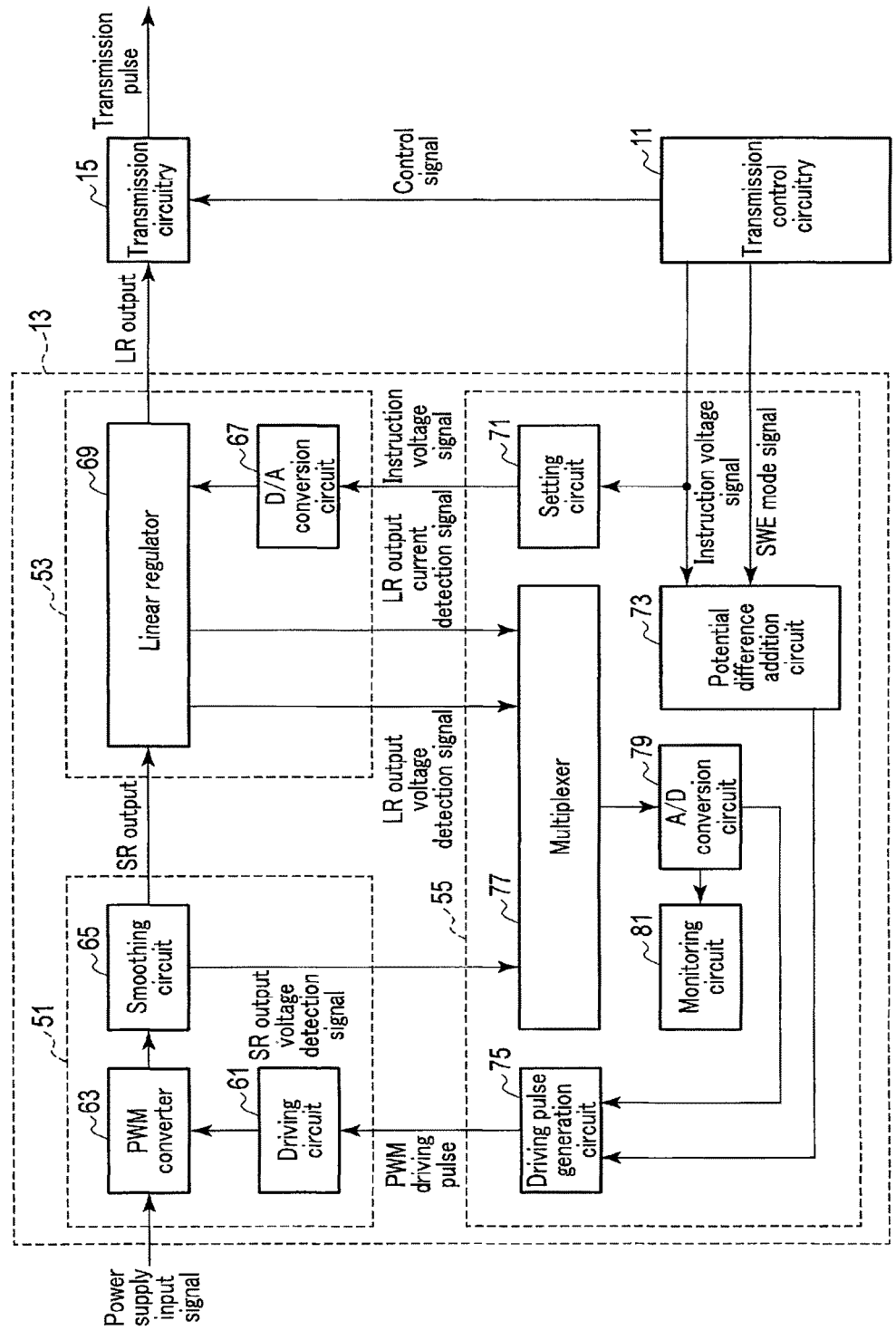
F I G. 4

ULTRASONIC DIAGNOSTIC APPARATUS

CROSS-REFERENCE TO RELATED APPLICATIONS

This application is based upon and claims the benefit of priority from the prior Japanese Patent Application No. 2015-134526, filed Jul. 3, 2015 the entire contents of which are incorporated herein by reference.

FIELD

Embodiments described herein relate generally to an ultrasonic diagnostic apparatus.

BACKGROUND

Ultrasonic diagnostic apparatuses emit ultrasonic pulses (transmitted ultrasonic waves) generated from piezoelectric elements included in ultrasonic probes to a subject, and displays on a display device electric signals obtained by converting reflective waves (received ultrasonic waves) generated due to differences between acoustic impedances of tissues of the subject by the piezoelectric elements.

Each piezoelectric element of an ultrasonic probe is connected to a corresponding transmission circuitry. A transmission circuitry generates a transmission pulse in accordance with a peak value of an output from a DC power supply. The DC power supply may be formed of a switching regulator which accomplishes high efficiency, downsizing, and low cost, and a linear regulator which receives an output from the switching regulator, so that a peak value of a transmission pulse can be arbitrarily changed, and transmission pulse dispersion can be reduced.

The potential difference between input and output of the linear regulator is set and controlled to be a unique value at a particular output voltage. The time length of an ordinary transmission pulse is about 10 µs. In this case, since the output from the switching regulator temporarily decreases, the amount of decrease does not become greater than the potential difference between input and output of the linear regulator. Accordingly, the output of the linear regulator itself is not lowered.

However, in the Shear Wave Elastography mode (SWE mode), the time length of transmission pulse becomes around 1000 µs, and the amount of decrease of the output voltage from the switching regulator exceeds the potential difference between input and output of the linear regulator. This results in decreasing the output of the linear regulator itself.

If the output of the linear regulator is lowered, the strength of the transmission pulse is lowered in the middle of transmission. If the strength of the transmission pulse is lowered in the middle of transmission when the strength of the transmission pulse is controlled by an MI value, power that is supposed to be transmitted cannot be successfully supplied, and accordingly, the sensitivity of the ultrasonic diagnostic apparatus decreases.

If the potential difference between input and output of the linear regulator is enlarged in order to avoid the drop of the output voltage of the switching regulator from exceeding the potential difference between the input and output of the linear regulator, the loss of the linear regulator becomes significant except for the SWE mode. This increases the size and the cost of the apparatus to cool the DC power supply.

BRIEF DESCRIPTION OF THE DRAWINGS

FIG. 2 illustrates the configuration of the transmission circuitry shown in FIG. 1.

FIG. 4 illustrates the configuration of the transmission power supply circuitry shown in FIG. 1.

DETAILED DESCRIPTION

In general, according to one embodiment, an ultrasonic diagnostic apparatus includes regulator circuitry, transmission circuitry, and control circuitry. The regulator circuitry convert a power supply input in accordance with a driving pulse signal to generate an output signal. The transmission circuitry convert the output signal to a transmission pulse to drive a ultrasonic probe. The control circuitry generate a driving pulse signal to increase the output signal when allowing the transmission circuitry to generate a transmission pulse having a strength and/or a time width equal to or greater than a predetermined value, in comparison to when allowing the transmission circuitry to generate a transmission pulse having a strength and/or a time width equal to or less than the predetermined value.

In the following sections, the ultrasonic diagnostic apparatus according to the embodiment will be explained with reference to the drawings.

Figure 1:
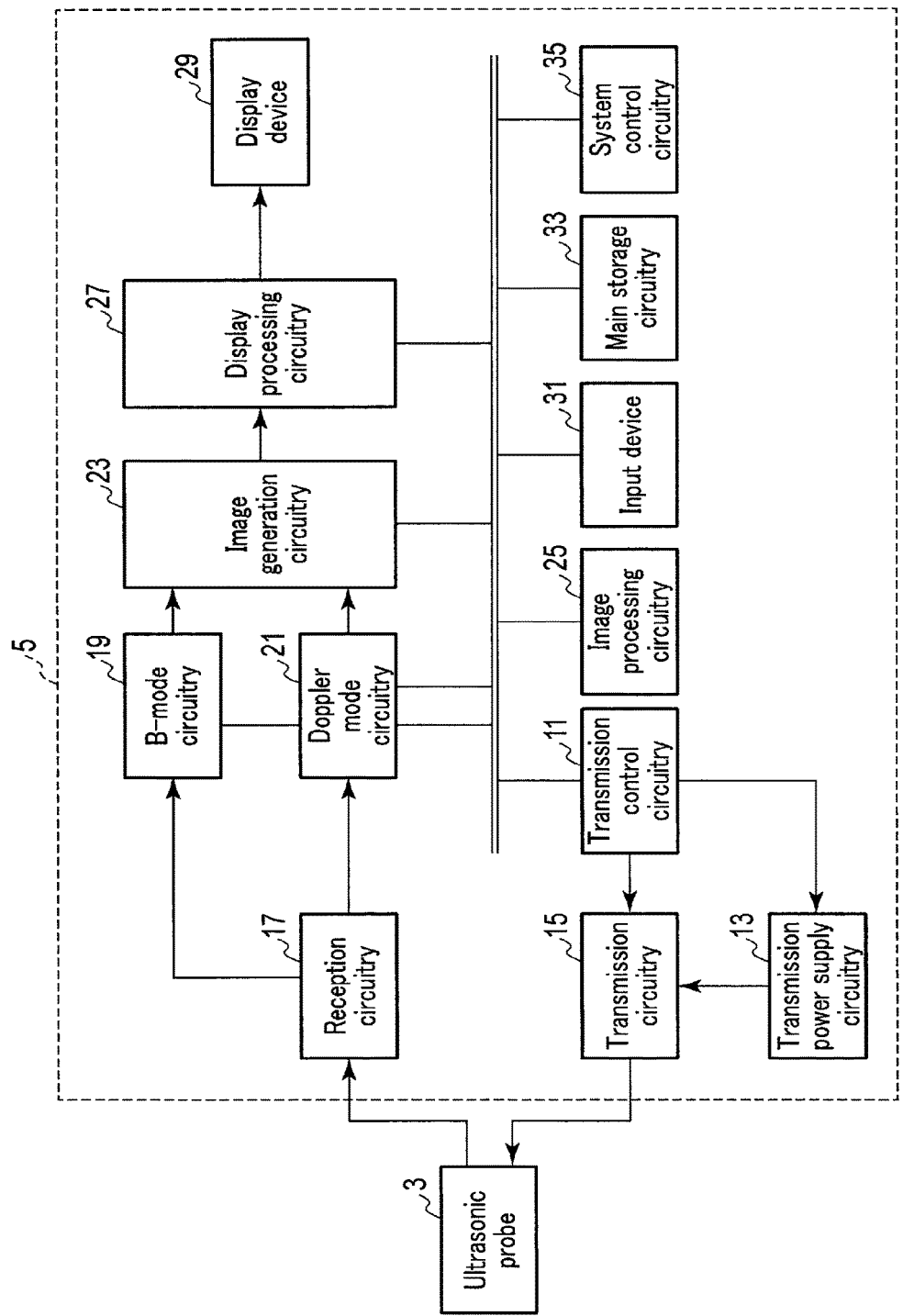
FIG. 1 illustrates the configuration of an ultrasonic diagnostic apparatus of the present embodiment.

FIG. 1 illustrates the configuration of an ultrasonic diagnostic apparatus 1 of the present embodiment. As shown in FIG. 1, the ultrasonic diagnostic apparatus 1 includes an ultrasonic probe 3 and an apparatus main body 5.

The ultrasonic probe 3 includes a probe head. The probe head is comprised with a piezoelectric element array. The piezoelectric element array includes a plurality of piezoelectric elements which are arranged as a one-dimensional or two-dimensional array. A probe cable is connected at one end to the proximal portion of the probe head. A probe connector is attached to the other end of the probe cable. The probe connector is mounted on the apparatus main body 5. In the state where the probe connector is mounted on the apparatus main body 5, various electric signals are transmitted and received between the ultrasonic probe 3 and the apparatus main body 5.

The piezoelectric elements transmit or receive ultrasonic waves. Specifically, the piezoelectric elements receive a transmission pulse from the apparatus main body 5 through the probe cable. Upon reception of the transmission pulse, the piezoelectric elements transmit ultrasonic waves to a subject, and receive ultrasonic waves reflected by the subject to generate an echo signal in accordance with the received ultrasonic waves. The generated echo signal is supplied to the apparatus main body 5 through the probe cable. The amplitude of the echo signal depends on the difference in the acoustic impedance at the boundary showing discontinuity of the acoustic impedance that affects the reflection of ultrasonic waves. In addition, if ultrasonic waves are reflected off of a moving object such as a bloodstream or the surface of the cardiac wall, the frequency of an echo signal is shifted depending on velocity components in the direction of the transmitted ultrasonic waves in the moving object due to the Doppler effect.

The apparatus main body 5 is a computer apparatus which controls the ultrasonic probe 3 and processes an echo signal from the ultrasonic probe 3. The apparatus main body 5 specifically includes transmission control circuitry 11, transmission power supply circuitry 13, transmission circuitry 15, reception circuitry 17, B-mode circuitry 19, Doppler mode circuitry 21, image generation circuitry 23, image processing circuitry 25, display processing circuitry 27, a display device 29, an input device 31, main storage circuitry 33, and system control circuitry 35. The transmission control circuitry 11, the B-mode circuitry 19, the Doppler mode circuitry 21, the image generation circuitry 23, the image processing circuitry 25, the display processing circuitry 27, the display device 29, the input device 31, the main storage circuitry 33, and the system control circuitry 35 are connected through buses to communicate with each other.

The transmission control circuitry 11 independently controls the transmission circuitry 15 and the transmission power supply circuitry 13. For example, the transmission control circuitry 11 supplies a control signal to the transmission circuitry 15 so that the ultrasonic probe 3 transmits a transmission ultrasonic beam having a predetermined transmission direction and transmission strength. In addition, the transmission control circuitry 11 supplies to the transmission power supply circuitry 13 a signal indicating a scan mode in which a transmission pulse having a strength equal to or greater than a predetermined value and/or a time length equal to or greater than a predetermined value is generated (hereinafter referred to as "strong pulse mode"). A signal indicating the strong pulse mode is referred to as a strong pulse mode signal, in the following explanation. A transmission pulse having a strength equal to or greater than a predetermined value and/or a time length equal to or greater than a predetermined value includes, for example, a transmission pulse for the ShearWave Elastography mode (SWE mode), or a transmission pulse for bursting bubbles included in a ultrasonic contrast agent. A transmission pulse having a predetermined strength and/or a predetermined time length is, for example, a transmission pulse for the B-mode or Doppler mode, other than a transmission pulse for the SWE mode and a transmission pulse for bursting bubbles included in a ultrasonic contrast agent. The mode where a transmission pulse having the predetermined strength and/or the predetermined time length is transmitted is referred to as normal mode in the following explanation. A transmission pulse for the SWE mode has a strength equal to or greater than a predetermined value and a time length equal to or greater than a predetermined value, in comparison to a normal pulse mode. A transmission pulse for the strong pulse mode may have a strength equal to or greater than the predetermined value and a time length equal to or greater than the predetermined value, or the predetermined strength and a time length equal to or greater than the predetermined value.

The transmission power supply circuitry 13 generate an output signal (hereinafter referred to as "power supply output") to be supplied to the transmission circuitry 15 based on an input signal, such as a DC input from an external power supply. The transmission power supply circuitry 13 switch generation modes of a power supply output depending on whether or not a strong pulse mode signal is supplied. The power supply output is supplied to the transmission circuitry 15.

The transmission circuitry 15 generate a transmission pulse based on the power supply output from the transmission power supply circuitry 13 in accordance with a control signal output from the transmission control circuitry 11. The generated transmission pulse is supplied to a piezoelectric element to be driven. The piezoelectric element generates ultrasonic waves upon reception of the transmission pulse.

Figure 3:
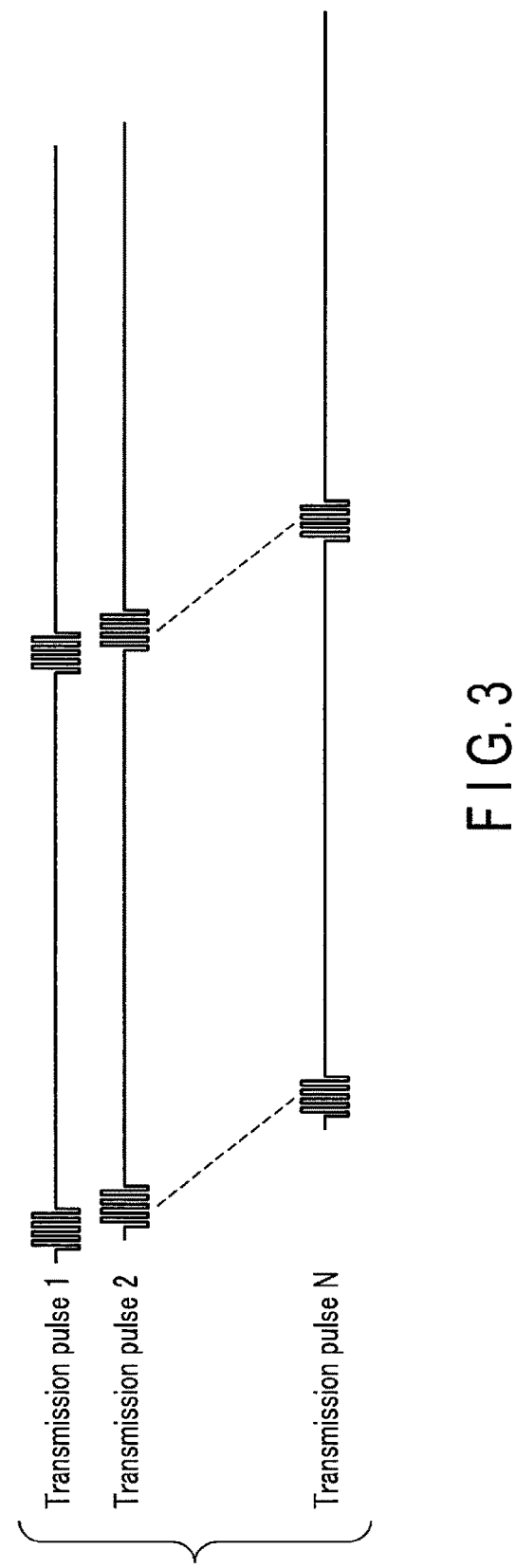
FIG. 3 illustrates the transmission timings of transmission pulses in the transmission circuitry shown in FIG. 1.

FIG. 2 illustrates the configuration of the transmission circuitry 15. FIG. 3 illustrates the transmission timings of transmission pulses from the transmission circuitry. As shown in FIG. 2, the ultrasonic diagnostic apparatus includes N (N is an integer) transmission circuits 15 each connected to the transmission power supply circuitry 13. For example, the transmission circuit 15 is provided for each transmission channel. As shown in FIG. 3, the transmission circuit 15 transmits a transmission pulse to the connected piezoelectric element in a timing according to control by the transmission control circuitry 11.

The reception circuitry 17 include an amplification circuit, an A/D converter, a delay circuit, and an adder not shown in the drawings. The amplification circuit amplifies an echo signal obtained through the ultrasonic probe for each channel. The A/D converter converts the amplified analog echo signal to a digital echo signal. The delay circuit determines a reception directivity relative to the digitalized echo signal, and applies a delayed time required for performing dynamic focus reception. Then, the adder performs adding process. This addition results in emphasizing reflective components from the direction corresponding to the reception directivity of the echo signal, and forming synthetic beams for ultrasonic transmission and reception based on the receiving directivity and the transmission directivity.

The B-mode circuitry 19 perform logarithmic growth or envelope detection to the echo signal from the reception circuitry 17, and generates B-mode data that expresses a signal strength with the degree of luminance.

The Doppler mode circuitry 21 perform autocorrelation calculation to the echo signal from the reception circuitry 17, extracts a bloodstream, a tissue, and a contrast agent echo component due to the Doppler effect, and generates Doppler data that expresses in color the strength of bloodstream information such as an average speed, dispersion and power.

The image generation circuitry 23 generate RAW data defined by ultrasonic scanning lines by using data received from the B-mode circuitry 19 or the Doppler mode circuitry 21. The image generation circuitry 23 perform RAW-pixel conversion to the RAW data to generate two-dimensional image data composed of a plurality of pixels arranged as a two-dimensional array. Otherwise, the image generation circuitry 23 perform RAW-voxel conversion to the RAW data to generate three-dimensional image data composed of a plurality of voxels arranged as a three-dimensional array. For example, the image generation circuitry 23 are implemented by a scan converter.

The image processing circuitry 25 perform various image processing to image data such as two-dimensional image data or three-dimensional image data generated at the image generation circuitry 23. For example, the image processing circuitry 25 perform image processing such as volume rendering, multi planar reconstruction (MPR), and maximum intensity projection (MIP) to the three-dimensional image data to generate two-dimensional image data.

The display processing circuitry 27 perform various display processing such as dynamic range correction, brightness correction, contrast correction, γ-curve correction, and RGB conversion to the image data generated at the image generation circuitry 23 or the image processing circuitry 25.

The display device 29 displays the image data supplied from the display processing circuitry 27 after being subjected to display processing as a display image. Any display known in this technical field, such as a CRT display, a liquid crystal display, an organic EL display, an LED display, and a plasma display can be applied as the display device 29.

The input device 31 accepts various instructions and information inputs from a user. The input device 31 may be a keyboard, a mouse, a touch panel, a trackball, or various switches, etc.

The main storage circuitry 33 have a storage device storing various information, such as a hard disk drive (HDD) or a solid state drive (SSD). The main storage circuitry 33 may be a CD-ROM drive, a DVD drive, or a drive that performs reading and writing operations of various information to a transportable storage medium, such as a flash drive. For example, the main storage circuitry 33 store a control program of ultrasonic scanning or image data.

The system control circuitry 35 function as a central element of the ultrasonic diagnostic apparatus of the present embodiment. Specifically, the system control circuitry 35 read the control program stored in the main storage circuitry 33, expands it in a memory, and controls the respective units of the ultrasonic diagnostic apparatus in accordance with the expanded control program.

The B-mode circuitry 19, the Doppler mode circuitry 21, the image generation circuitry 23, the image processing circuitry 25, the display processing circuitry 27, and the system control circuitry 35 each include a processor such as a central processing unit (CPU), a microprocessing unit (MPU), and a graphics processing unit (GPU), and a memory such as a read-only memory (ROM) and a random access memory (RAM) as hardware resources. The B-mode circuitry 19 may be implemented by an application specific integrated circuit (ASIC), and a field programmable logic device (FPGA), a complex programmable logic device (CPLD), or a simple programmable logic device (SPLD). The processor accomplishes the above functions by reading a program stored in the memory and executing it. The processor may install a program inside a circuit within the processor, instead of storing a program into the memory. In this case, the processor accomplishes the above functions by reading the program installed in the circuit and executing it.

The B-mode circuitry 19, the Doppler mode circuitry 21, the image generation circuitry 23, the image processing circuitry 25, the display processing circuitry 27, and the system control circuitry 35 may be mounted on a single processor, or on separate processors. The B-mode circuitry 19, the Doppler mode circuitry 21, the image generation circuitry 23, the image processing circuitry 25, the display processing circuitry 27, and the system control circuitry 35 may be mounted on a board, or on separate boards.

Next, the transmission power supply circuitry 13 according to the embodiment will be explained as example 1 and example 2.

Example 1

FIG. 4 illustrates the configuration of the transmission power supply circuitry 13 according to example 1. As shown in FIG. 4, the transmission power supply circuitry 13 are connected to the transmission control circuitry 11 and the transmission circuitry 15. The transmission control circuitry 11 supply to the transmission power supply circuitry 13 a strong pulse mode signal and an instruction voltage signal corresponding to the peak value of a desired transmission pulse. The transmission power supply circuitry 13 convert a DC power supply input from an external power supply into a power supply output (LR output) having the peak value corresponding to the instruction voltage signal from the transmission control circuitry 11.

Specifically, the transmission power supply circuitry 13 include a first regulator circuit 51, a second regulator circuit 53, and a regulator control circuit 55. The first regulator circuit 51 converts the DC power supply input into an output signal in accordance with a driving pulse signal supplied from the regulator control circuit 55. The first regulator circuit 51 specifically generates an output signal by pulse width modulation (PWM). Accordingly, the driving pulse signal from the regulator control circuit 55 is referred to as a PWM driving pulse signal. The output signal from the first regulator circuit 51 is supplied to the second regulator circuit 53. The second regulator circuit 53 converts the output signal from the first regulator circuit 51 in accordance with the instruction voltage signal corresponding to the peak value of the desired transmission pulse to generate a power supply output. The power supply output is supplied to the transmission circuitry 15. The regulator control circuit 55 generates a PWM driving pulse to be supplied to the first regulator circuit 51 in order to generate a transmission pulse according to the instruction voltage signal from the transmission control circuitry 11. In the present embodiment, the regulator control circuit 55 generates a PWM driving pulse to increase the potential difference between input and output of the second regulator circuit 53, i.e., the potential difference between the output signal from the first regulator circuit 51 and the output signal from the second regulator circuit 53, in the case of allowing the transmission circuitry 15 to generate a transmission pulse having a strength equal to or greater than a predetermined value and/or a time length equal to or greater than a predetermined value (i.e., the case where a strong pulse mode signal is supplied from the transmission control circuitry 11), in comparison to the case of allowing the transmission circuitry 15 to generate a transmission pulse having a strength equal to or less than a predetermined value and/or a time length equal to or less than a predetermined value (i.e., the case where a strong pulse mode signal is not supplied from the transmission control circuitry 11).

Any regulator can be applied to the first regulator circuit 51 or the second regulator circuit 53; however, it is favorable to apply a switching regulator circuit 51 which realizes high efficiency, downsizing, and low manufacturing costs as the first regulator circuit 51, and to apply a linear regulator circuit 53 as the second regulator circuit 53. In the following explanation, it is assumed that the first regulator circuit 51 is the switching regulator circuit 51, and the second regulator circuit 53 is the linear regulator circuit 53. In addition, an output signal from the switching regulator circuit 51 is referred to as an SR output, and an output signal from the linear regulator circuit 53 is referred to as an LR output.

The switching regulator circuit 51 includes a driving circuit 61, a PWM converter 63 and a smoothing circuit 65. The switching regulator circuit 51 may be a buck-type regulator circuit or a boost-type regulator circuit. The driving circuit 61 drives the PWM converter 63 in accordance with a PWM driving pulse from the regulator control circuit 55. The PWM converter 63 generates a series of pulse signals having a pulse width corresponding to a pulse width of the PWM driving pulse. Specifically, the PWM converter 63 includes a switch. The PWM converter 63 performs switching with a switching frequency in accordance with the pulse width of the PWM driving pulse to generate a series of pulse signals having the pulse width corresponding to that of the PWM driving pulse. The smoothing circuit 65 includes an inductor and a conductor. The smoothing circuit 65 generates an SR output by smoothing a pulse signal received from the PWM converter 63. The SR output is supplied to the linear regulator circuit 53 and the regulator control circuit 55. An SR output voltage detection signal indicating a detected value of the voltage the SR output is supplied to the regulator control circuit 55.

The linear regulator circuit 53 includes a D/A conversion circuit 67 and a linear regulator 69. The D/A conversion circuit 67 converts an instruction voltage signal received from the regulator control circuit 55 from a digital signal to an analog signal. The linear regulator 69 may be any regulator such as a shunt regulator, a series regulator, a three-terminal regulator, or an LDO regulator. The linear regulator 69 converts an SR output from the smoothing circuit 65 into an LR output having a voltage value in accordance with the instruction voltage signal. The linear regulator 69 typically generates an LR output by decreasing a voltage value of an SR output to a voltage value according to the instruction voltage signal by load. That is, the difference between an input signal (SR output) and an output signal (LR output) causes a loss, and the linear regulator 69 generates heat due to the loss. The LR output is supplied to the transmission circuitry 15. An LR output current detection signal indicating a detected value of the current of the LR output, and an LR output voltage detection signal indicating a detected value of the voltage of the LR output are supplied to the regulator control circuit 55.

The regulator control circuit 55 includes a setting circuit 71, a potential difference addition circuit 73, a driving pulse generation circuit 75, a multiplexer 77, an A/D conversion circuit 79, and a monitoring circuit 81.

The setting circuit 71 generates an instruction voltage signal in accordance with a set voltage value of the LR output to allow the transmission circuitry 15 to generate a transmission pulse based on the instruction voltage signal received from the transmission control circuitry 11. The generated instruction voltage signal is supplied to the linear regulator 69.

The potential difference addition circuit 73 generates an instruction voltage signal for generating a driving pulse upon reception of the instruction voltage signal from the transmission control circuitry 11. The potential difference addition circuit 73 generates an instruction voltage signal for generating a driving pulse by adding a voltage value to adjust the potential difference between input and output of the linear regulator 69 to the received instruction voltage signal. The generated instruction voltage signal is supplied to the driving pulse generation circuit 75. Specifically, the potential difference addition circuit 73 stores an adjustment voltage value for a normal mode and an adjustment voltage value for an SWE mode in a memory. If a strong pulse mode signal is supplied, the potential difference addition circuit 73 adds an adjustment voltage value for a strong pulse mode to the instruction voltage signal received from the transmission control circuitry 11. If a strong pulse mode signal is not supplied, the potential difference addition circuit 73 adds the adjustment voltage value for the normal mode to the instruction voltage signal received from the transmission control circuitry 11.

The multiplexer 77 supplies to the A/D conversion circuit 79 an SR output voltage detection signal from the smoothing circuit 65, an LR output voltage detection signal, and an LR output current detection signal from the linear regulator 69. The A/D conversion circuit 79 converts the SR output voltage detection signal, the LR output voltage detection signal, and the LR output current detection signal from the multiplexer 77 from analog signals to digital signals. The SR output voltage detection signal, the LR output voltage detection signal, and the LR output current detection signal are supplied to the monitoring circuit 81 and the driving pulse generation circuit 75. The monitoring circuit 81 monitors the SR output voltage detection signal, the LR output voltage detection signal, and the LR output current detection signal.

The driving pulse generation circuit 75 generates a PWM driving pulse based on the comparison between the instruction voltage signal for generating a driving pulse received from the potential difference addition circuit 73, and the SR output or the LR output. Specifically, the driving pulse generation circuit 75 generates a PWM driving pulse by feedback control in which the SR output voltage detection signal, the LR output voltage detection signal, and the LR output current detection signal are fed back to reach a target value set based on the instruction voltage signal for generating a driving pulse. The driving pulse generation circuit 75 specifically includes an error amplifier, a phase compensation filter, and a PWM pulse generation circuit. The error amplifier compares the SR output voltage detection signal or the LR output voltage detection signal with the instruction voltage signal. The phase compensation filter performs phase compensation to an output signal of the error amplifier. The PWM pulse generation circuit generates a PWM driving pulse by modulating to the pulse width of the PWM driving pulse the output signal subjected to the phase compensation. The generated PWM driving pulse is supplied to the driving circuit 61.

Next, an example of an operation performed by the transmission power supply circuitry 13 will be explained.

Figure 5:
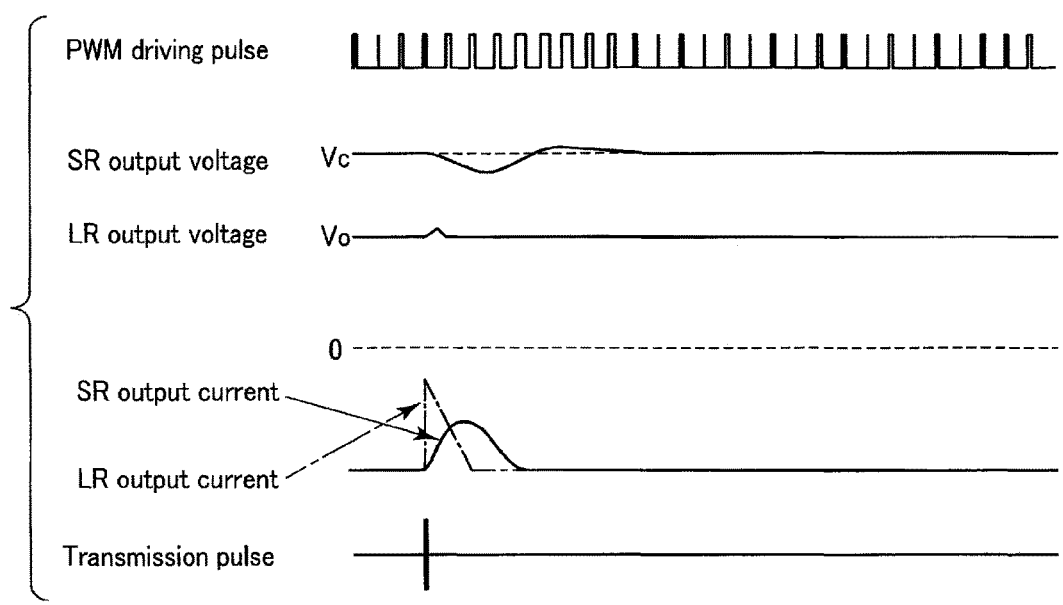
FIG. 5 illustrates a timing chart for the transmission power supply circuitry and the transmission circuitry according to example 1 in normal mode.

FIG. 5 illustrates a timing chart for the transmission power supply circuitry 13 and the transmission circuitry 15 according to example 1 in normal mode. In this example, Vc represents the value of the SR output voltage of a PWM driving pulse that is not modulated, and Vo represents the value of the LR output voltage when the adjustment voltage value for the normal mode is used. In the normal mode, the transmission control circuitry 11 supply to the potential difference addition circuit 73 an instruction voltage signal to allow the transmission circuitry 15 to generate a transmission pulse for the normal mode.

In addition, the transmission control circuitry 11 do not supply an SWE mode signal. If an instruction for generating a transmission pulse is made in the normal mode, i.e., an SWE mode signal is not supplied from the transmission control circuitry 11, the potential difference addition circuit 73 generates an instruction voltage signal for generating a driving pulse by adding the adjustment voltage value for the normal mode to the instruction voltage signal from the transmission control circuitry 11. The adjustment voltage value for the normal mode corresponds to the difference between Vc and Vo.

As shown in FIG. 5, the driving pulse generation circuit 75 generates a PWM driving pulse having a duty cycle for allowing the transmission circuitry 15 to generate a transmission pulse for the normal mode under the feedback control. Specifically, the driving pulse generation circuit 75 enlarges the duty cycle of the PWM driving pulse. The duty cycle indicates the ratio of the pulse width of an OFF signal to the pulse width of an ON signal of the PWM driving pulse, i.e., an ON duty cycle. The switching regulator circuit 51 generates an SR output upon reception of the PWM driving pulse. The SR output voltage decreases as the duty cycle becomes larger. The linear regulator circuit 53 generates an LR output in accordance with the SR output. The linear regulator circuit 53 can generate an LR output in accordance with the instruction voltage signal when the SR output voltage exceeds the LR output voltage. In the normal mode, the pulse width of the transmission pulse is about 10 μs. Accordingly, if a transmission pulse is generated in the normal mode, the SR output voltage does not decrease to fall below the LR output voltage Vo since the SR output voltage merely decreases slightly. In addition, since the SR output voltage merely decreases slightly, the adjustment voltage value to be added to the instruction voltage signal by the potential difference addition circuit 73 (i.e., the difference between Vc and Vo) is set to be a relatively small value.

Figure 6:
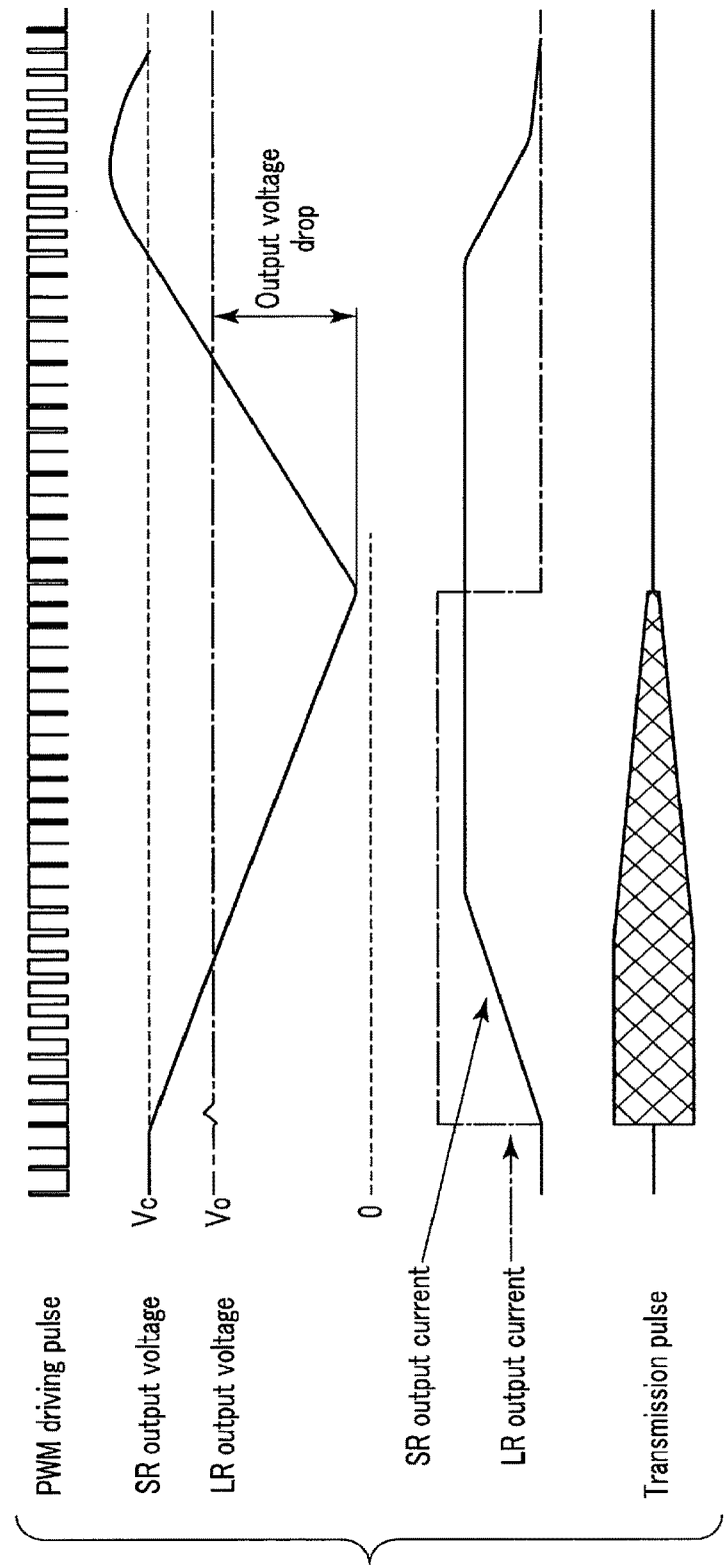
FIG. 6 illustrates a timing chart for the transmission power supply circuitry and the transmission circuitry in strong pulse mode when applying an adjustment voltage for the normal mode.

FIG. 6 illustrates a timing chart for the transmission power supply circuitry and the transmission circuitry in SWE mode when applying an adjustment voltage in the normal mode. As shown in FIG. 6, the driving pulse generation circuit 75 generates a PWM driving pulse having a duty cycle for allowing the transmission circuitry 15 to generate a transmission pulse for the SWE mode under the feedback control. Specifically, the driving pulse generation circuit 75 enlarges the duty cycle of the PWM driving pulse. The SR output voltage Vc decreases as the SR output is generated.

The linear regulator circuit 53 generates an LR output in accordance with the SR output from the switching regulator circuit 51 while the transmission pulse is generated. The transmission circuitry 15 generate a transmission pulse while the LR output current flows. In the SWE mode, the pulse width of the transmission pulse is about 1000 μs. Accordingly, if a transmission pulse is generated in the SWE mode, the SR output voltage Vc decreases to fall below the LR output voltage Vo with the same adjustment voltage value as for the normal mode since the SR output voltage Vc decreases significantly. If the SR output voltage Vc decreases to fall below the LR output voltage Vo, the strength of the transmission pulse is lowered, and accordingly the strength of ultrasonic waves is lowered in comparison to the set value.

The regulator control circuit 55 according to the embodiment applies a greater adjustment voltage value for the SWE mode in comparison with the normal mode to prevent the SR output voltage Vc from decreasing to fall below the LR output voltage Vo in the SWE mode.

Figure 7:
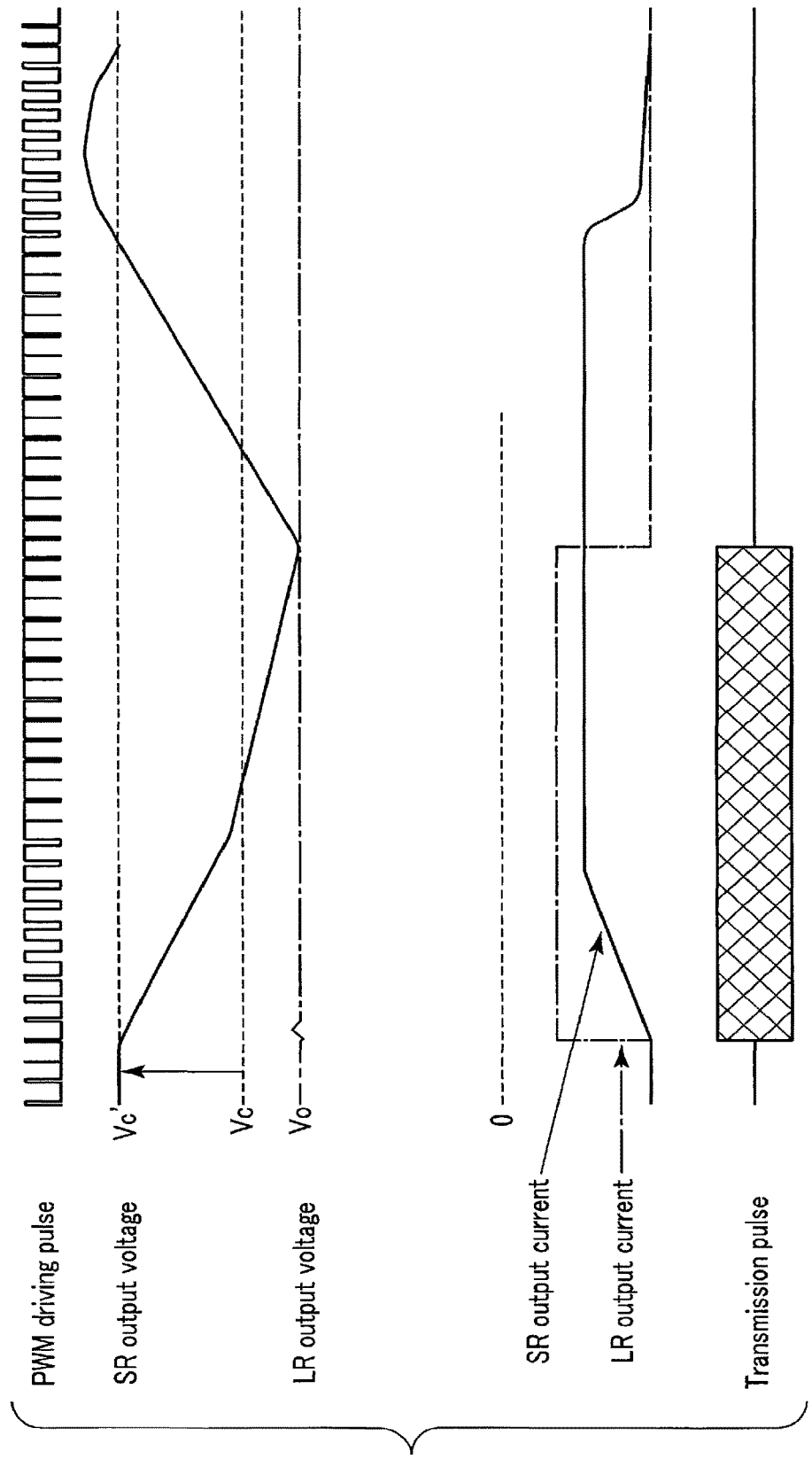
FIG. 7 illustrates a timing chart for the transmission power supply circuitry and the transmission circuitry according to example 1 in SWE mode when applying an adjustment voltage for the SWE mode.

FIG. 7 illustrates a timing chart for the transmission power supply circuitry 13 and the transmission circuitry 15 according to example 1 in SWE mode when applying an adjustment voltage for the SWE mode. In this example, Vc' represents a voltage value of the SR output voltage of a PWM driving pulse that is not modulated when the adjustment voltage value for the SWE mode is used. In the SWE mode, the transmission control circuitry 11 supply to the potential difference addition circuit 73 an instruction voltage signal to allow the transmission circuitry 15 to generate a transmission pulse for the SWE mode. In addition, the transmission control circuitry 11 supply an SWE mode signal to the potential difference addition circuit 73. If the SWE mode signal is supplied, the potential difference addition circuit 73 generates an instruction voltage signal for generating a driving pulse by adding the adjustment voltage value for the SWE mode to the instruction voltage signal from the transmission control circuitry 11. The advantage voltage value for the SWE mode corresponds to the difference between Vc' and Vo.

The adjustment voltage value for the SWE mode is set to be higher than the LR output voltage Vo even if the SR output voltage becomes a minimum value. In other words, the adjustment voltage value for the SWE mode is set to be greater than the difference between the Vc' and the minimum value of the SR output value when the PWM driving pulse is modulated. In addition, if the difference between Vc' and Vo is large, the loss by the linear regulator 69 becomes large. Accordingly, the adjustment voltage value for the SWE mode is preferably set to be greater than the minimum value of the SR output voltage and close to Vo. By this setting, the loss by the linear regulator 69 can be decreased in the SWE mode. Specifically, the adjustment voltage value for the SWE mode is determined based on the circuit design of the switching regulator circuit 51 and the linear regulator circuit 53. Otherwise, the adjustment voltage value for the SWE mode may be set to be a different value in accordance with the ultrasonic probe 3, the number of opening channels, or the voltage value of the instruction voltage signal.

The driving pulse generation circuit 75 generates a PWM driving pulse having a duty cycle for allowing the transmission circuitry 15 to generate a transmission pulse for the SWE mode under the feedback control. Specifically, the driving pulse generation circuit 75 enlarges the duty cycle of the PWM driving pulse under the feedback control. Typically, the duty cycle of the PWM driving pulse is expanded to about the maximum value. The SR output voltage from the switching regulator circuit 51 decreases as the duty cycle becomes larger. However, since the adjustment voltage value for the SWE mode is added to the instruction voltage signal, the SR output voltage never decreases to fall below Vo. Accordingly, a transmission pulse having a certain strength and exhibiting a square-wave relative to the time axis can be generated, as shown in FIG. 7.

As stated above, the regulator control circuit 55 according to the example 1 sets a larger adjustment voltage value in the SWE mode than in the normal mode to widen the potential difference between input and output of the linear regulator circuit 53. With this feature, since the SR output voltage never decreases to fall below the LR output voltage, the transmission circuitry 15 can generate a transmission pulse exhibiting a square-wave relative to the time axis. Accordingly, in comparison with the case where a common adjustment voltage value is used for the SWE mode and the normal mode, the adjustment voltage value in the normal mode can be reduced, thereby reducing the size and the costs for cooling the linear regulator circuit 53.

In the above embodiment, the transmission power supply circuitry 13 include the first regulator circuit 51 and the second regulator circuit 53. However, the present embodiment is not limited to this configuration. The transmission power supply circuitry 13 according to the embodiment may only include the first regulator circuit 51. In this case, the smoothing circuit 65 is connected to the transmission circuitry 15, and an SR output from the smoothing circuit 65 is input to a transmission circuitry 16.

In this configuration, the regulator control circuit 55 generates a PWM driving pulse to increase the SR output in comparison with the transmission pulse in the normal pulse mode, when allowing the transmission circuitry 15 to generate a transmission pulse in the strong pulse mode. For example, the transmission control circuitry 73 receives from the transmission control circuitry 11 an SWE mode signal and an instruction voltage signal corresponding to the peak value of a desired transmission pulse. As stated above, the potential difference addition circuit 73 generates an instruction voltage signal for generating a driving pulse upon reception of the instruction voltage signal from the transmission control circuitry 11, and the driving pulse generation circuit 75 generates a PWM driving pulse based on the comparison between the instruction voltage signal for generating a driving pulse with the SR output.

The PWM driving pulse is supplied to the driving circuit 61. The driving circuit 61 drives the PWM converter 63 in accordance with the PWM driving pulse. The PWM converter 63 generates a series of pulse signals by switching with a switching frequency in accordance with the pulse width of the PWM driving pulse, based on a DC power supply input. The smoothing circuit 65 generates an SR signal by smoothing the series of pulse signals. By this operation, the first regulator circuit 51 generates an SR output corresponding to the peak value of the desired transmission pulse. The transmission circuitry 16 convert the SR output from the smoothing circuit 65 into a transmission pulse. The transmission pulse is supplied to the ultrasonic probe 3. Upon reception of the transmission pulse, the ultrasonic probe 3 is driven to generate ultrasonic waves in accordance with the desired transmission pulse.

As stated above, the transmission power supply circuitry 13 according to the embodiment can prevent the output voltage from the transmission power supply circuitry 13 from decreasing in any transmission mode even if only a single regulator circuit 51 is provided. In addition, it is possible to prevent lowering the strength of the transmission pulse in the middle of transmission, thereby preventing the sensitivity of the ultrasonic diagnostic apparatus from being degraded.

Example 2

In example 1, the driving pulse generation circuit 75 sets the duty cycle of the PWM driving pulse to be maximum by the feedback control. In this case, a delayed time is generated until the duty cycle of the PWM driving pulse becomes maximum, and accordingly, the potential difference between the SR output voltage and the LR output voltage must be enlarged. In example 2, the driving pulse generation circuit 75 sets the duty cycle of the PWM driving pulse to be maximum without performing the feedback control. An example of an operation performed by the transmission power supply circuitry 13 according to example 2 will be explained. In the explanation below, structural elements having substantially the same functions will be denoted by the same reference symbols, and a repetitive description will be given only where necessary.

Figure 8:
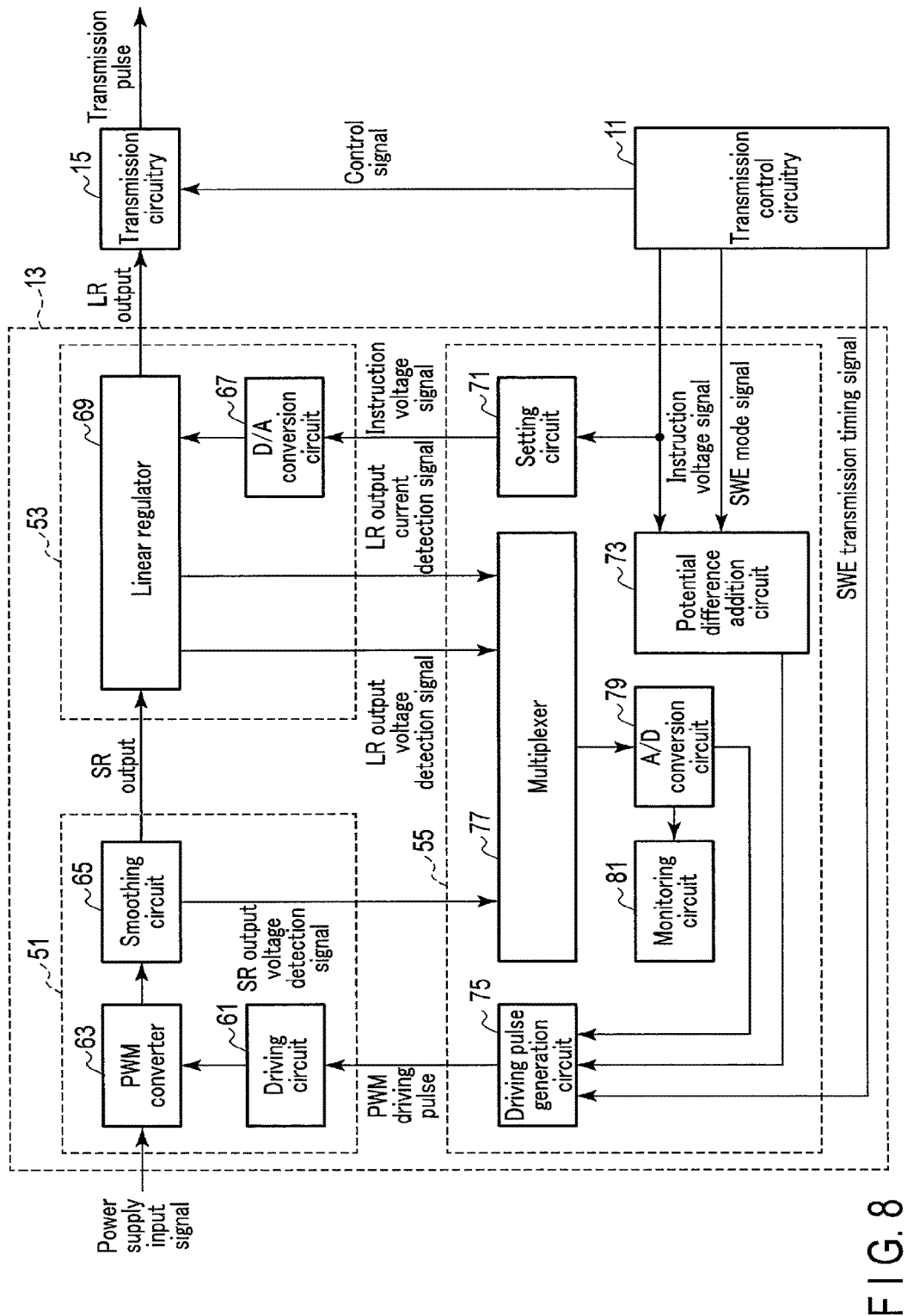
FIG. 8 illustrates the configuration of the transmission power supply circuitry according to example 2.

FIG. 8 illustrates the configuration of the transmission power supply circuitry 13 according to example 2. As shown in FIG. 8, the transmission power supply circuitry 13 are connected to the transmission control circuitry 11 and the transmission circuitry 15. The transmission control circuitry 11 supplies to the transmission power supply circuitry 13 an instruction voltage signal, an SWE mode signal, and as SWE transmission timing signal synchronized with a transmission pulse in the SWE mode. The signal length of the SWE transmission timing signal is consistent with the transmission period of the transmission pulse. The signal length of the SWE transmission timing signal is determined in advance.

The driving pulse generation circuit 75 generates a driving pulse signal by the feedback control if an SWE transmission timing signal is not supplied. The driving pulse generation circuit 75, on the other hand, compulsorily generates a driving pulse signal having a predetermined duty cycle by stopping the feedback control if an SWE transmission timing signal is supplied. The predetermined duty cycle is preferably set to be a value which reaches a target value in a shorter time than the time required for the duty cycle of the PWM driving pulse to reach a target value by feedback control. The predetermined duty cycle may be about the maximum value, for example. In the following explanation, it is assumed that the predetermined duty cycle is the maximum value. The predetermined duty cycle does not have to be the maximum value, and may be a value smaller than the maximum value, for example, when the set strength of a transmission pulse in the SWE mode is relatively low.

Figure 9:
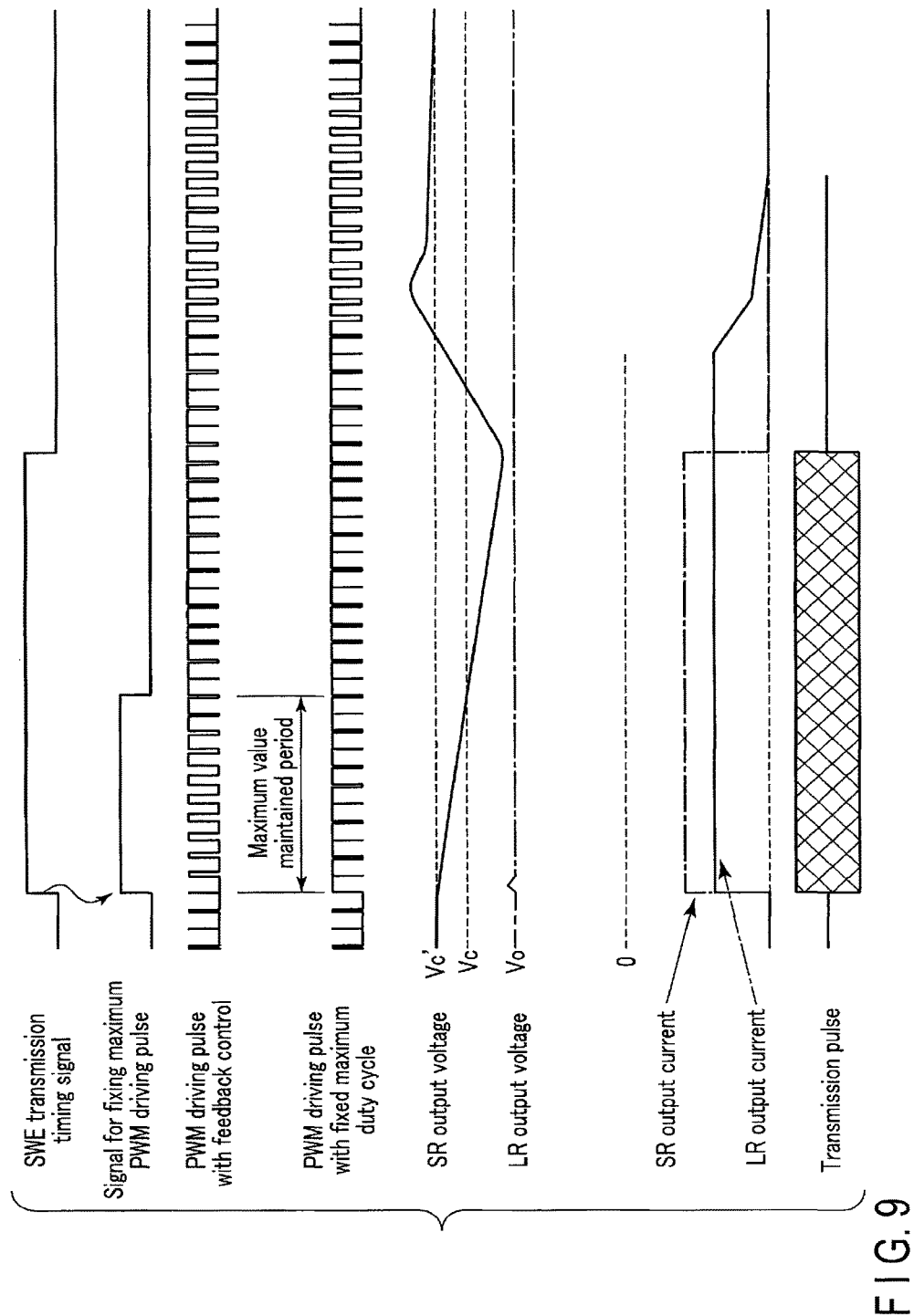
FIG. 9 illustrates a timing chart for the transmission power supply circuitry and the transmission circuitry according to example 2 in SWE mode.

FIG. 9 illustrates a timing chart for the transmission power supply circuitry and the transmission circuitry according to example 2 in SWE mode. In example 2, a PWM driving pulse is generated by compulsorily fixing the duty cycle at maximum without performing the feedback control. In FIG. 9, the PWM driving pulse with feedback control is shown for comparison with the driving pulse with the fixed maximum duty cycle.

In example 2, the transmission control circuitry 11 supply to the potential difference addition circuit 73 an instruction voltage signal, an SWE mode signal, and an SWE transmission timing signal in the SWE mode. As shown in FIG. 9, if an SWE transmission timing signal is supplied from the transmission control circuitry 11, a signal for fixing maximum PWM driving pulse is switched to be active for a certain time period. The regulator control circuit 55 stops feedback control while the signal for fixing maximum PWM driving pulse is active, and generates a PWM driving pulse in the state where the duty cycle is compulsorily set at maximum. The period in which the signal for fixing the maximum PWM driving pulse is active (maximum value maintained period) is set to be shorter than the time required for the duty cycle of the PWM driving pulse to reach the maximum value by feedback control. In other words, the sufficient period in which the signal for fixing maximum PWM driving pulse is active is the period required for the PWM driving pulse derived from the output voltage of the PWM converter 63 to reach maximum with the maximum rated load. The period in which the signal for fixing the maximum PWM driving pulse is active is determined experimentally.

In example 2, the regulator control circuit 55 stops feedback control while the signal for the fixing maximum PWM driving pulse is active, and generates a PWM driving pulse in the state where the duty cycle is compulsorily set at maximum. The SR output voltage decreases from Vc' as the SR output is generated. However, in example 2, since the duty cycle of the PWM driving pulse can be instantly maximized, the degree of SR output voltage decrease according to the generation of a transmission pulse in the SWE mode can be smaller in comparison with example 1. Thus, the potential difference of input and output of the linear regulator circuit 53 (i.e., difference between Vc' and Vo) according to example 2 can be smaller than example 1. In other words, the adjustment voltage value in example 2 can be set to be smaller than the adjustment voltage value in example 1. Accordingly, the SR output voltage is prevented from falling below Vo, and a transmission pulse having a certain strength and exhibiting a square-wave relative to the time axis can be generated.

As stated above, the regulator control circuit 55 according to example 2 compulsorily switches the duty cycle of the PWM driving pulse to be about the maximum value in the SWE mode. By this processing, the degree of SR output voltage decrease can be smaller than the case where the duty cycle is increased to about the maximum value by feedback control. Thus, in example 2 the potential difference between input and output of the linear regulator circuit 53 can be decreased more so than in example 1. With this feature, the size and costs for cooling the linear regulator circuit 53 can be further decreased.

In other words, the linear regulator circuit 53 according to example 1 can decrease the potential difference between input and output of the linear regulator circuit 53 without the need for providing a structure adopted in example 2 where feedback control is executed or stopped by synchronizing with the SWE transmission timing signal. That is, the linear regulator circuit 53 according to example 1 realizes a simpler circuit design than in example 2.

Modified Example 1

In example 2, the adjustment voltage value is set to be different in the normal mode and the SWE mode. However, a common adjustment voltage value can be used in the normal mode and the SWE mode unless the SR output voltage falls below the LR output voltage Vo in the SWE mode.

Modified Example 2

In example 2, the driving pulse generation circuit 75 switches the duty cycle to be a predetermined duty cycle (about the maximum value in the above explanation) by synchronizing with the SWE transmission timing signal. However, the present embodiment is not limited to this configuration. For example, if an SWE mode signal is supplied, the driving pulse generation circuit 75 monitors the current value of the LR output current while increasing the duty cycle by feedback control. Then, the driving pulse generation circuit 75 stops feedback control upon detecting that the current value of the LR output current exceeds a threshold, and sets the duty cycle to be a predetermined duty cycle such as at approximately the maximum value. Based on this processing, the regulator control circuit 55 according to modified example 2 simplifies control in comparison with example 2. On the other hand, the regulator control circuit 55 according to example 2 can instantly switch the duty cycle without waiting for the time when the current value of the LR output current exceeds a threshold, in comparison with modified example 2. Accordingly, the potential difference of input and output of the linear regulator circuit 69 according to example 2 can be smaller than modified example 2.

SUMMARY

As explained above, the ultrasonic diagnostic apparatus according to the embodiment comprises the first regulator circuit 51, the second regulator circuit 53, the transmission circuitry 15, and the regulator control circuit 55. The first regulator circuit 51 converts a power supply input in accordance with a driving pulse signal to generate an output signal. The second regulator circuit 53 converts a first output signal from the first regulator circuit 51, based on a first instruction voltage signal corresponding to the peak value of a desired transmission pulse to generate a second output signal. The transmission circuitry 15 convert the second output signal from the second regulator circuit 53 into a transmission pulse to drive a ultrasonic probe. The control circuit generates a driving pulse signal to increase the potential difference between the first and second output signals relative to the second regulator circuit 53 when allowing the transmission circuitry 15 to generate a transmission pulse having the strength equal to or greater than the predetermined value, and/or the time width equal to or greater than the predetermined value, in comparison to when allowing the transmission circuitry to generate a transmission pulse having the strength equal to or less than the predetermined value and/or the time width equal to or less than the predetermined value.

With the above configuration, the potential difference between input and output of the second regulator circuit 53 can be switched between the case of generating a transmission pulse having a strength equal to or greater than the predetermined value, and the case of generating a transmission pulse having a strength equal to or less than the predetermined value. Accordingly, the loss of the second regulator circuit 53 can be suppressed in the case of generating a transmission pulse having a strength equal to or less than the predetermined value, and at the same time, the voltage value of an input signal to the second regulator circuit 53 can be prevented from decreasing to fall below the set voltage value in the case of generating a transmission pulse having a strength equal to or greater than the predetermined value.

Therefore, the output voltage from the transmission power supply circuitry 13 can be prevented from decreasing regardless of the transmission mode, without increasing the size and costs for cooling. In addition, it is possible to prevent lowering the strength of the transmission pulse in the middle of transmission, thereby preventing the sensitivity of the ultrasonic diagnostic apparatus from being degraded.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The invention claimed is:

1. An ultrasonic diagnostic apparatus, comprising:
transmission power supply circuitry configured to receive a power supply input from an external power supply and convert the received power supply input to a power supply output in accordance with a first instruction voltage signal; and
transmission circuitry configured to receive the power supply output from the transmission power supply circuitry, convert the received power supply output to a transmission pulse, and drive an ultrasonic wave generating element with the transmission pulse to generate a ultrasonic wave from the ultrasonic wave generating element, a peak value of the transmission pulse corresponding to the first instruction voltage signal,
wherein the transmission power supply circuitry comprises:
regulator control circuitry configured to generate a driving pulse signal based on the first instruction voltage signal and an adjustment voltage value;
a switching regulator configured to receive the driving pulse signal from the regulator control circuitry and convert the power supply input to a first output signal in accordance with the received driving pulse signal; and a linear regulator configured to receive the first output signal from the switching regulator, convert the received first output signal to a second output signal based on the first instruction voltage signal, and supply the second output signal to the transmission circuitry as the power supply output of the transmission power supply circuitry, the adjustment voltage value defining a potential difference between a voltage of the first output signal of the switching regulator that is received by the linear regulator and a voltage of the second output signal of the linear regulator, and wherein the regulator control circuitry is configured to increase the adjustment voltage value in a first mode in which the transmission circuitry generates a first transmission pulse having a strength and/or a time width greater than a predetermined value, in comparison to the adjustment voltage value that would be applied if the regulator control circuitry set the adjustment voltage value in a way for a second mode in which the transmission circuitry generates the second transmission pulse having the strength and/or the time width equal to or less than the predetermined value.

2. The ultrasonic diagnostic apparatus according to claim 1, wherein the regulator control circuitry comprises:

addition circuitry configured to generate a second instruction voltage signal by adding the adjustment voltage value to the first instruction voltage signal to adjust the potential difference; and generation circuitry configured to generate the driving pulse signal based on a comparison between the second instruction voltage signal and the first output signal.

3. The ultrasonic diagnostic apparatus according to claim 2, wherein the addition circuitry is configured to increase the adjustment voltage value in the first mode to prevent a voltage value of the first output signal from falling below a voltage value of the second output signal when the transmission circuitry generates the first transmission pulse having the strength and/or the time width greater than the predetermined value.

4. The ultrasonic diagnostic apparatus according to claim 1, wherein the regulator control circuitry comprises generation circuitry configured to generate the driving pulse signal having a predetermined duty cycle based on the first instruction voltage signal and the increased adjustment voltage value when the transmission circuitry generates the first transmission pulse having the strength and/or the time width greater than the predetermined value in the first mode.

5. The ultrasonic diagnostic apparatus according to claim 4, wherein the regulator control circuitry further comprises:

addition circuitry configured to generate a second instruction voltage signal by adding the adjustment voltage value to the first instruction voltage signal to adjust the potential difference, wherein the generation circuitry is configured to generate the driving pulse signal by feedback control based on the second instruction voltage signal and the first output signal of the switching regulator in the second mode, and in the first mode, generate the driving pulse signal having the predetermined duty cycle instead of performing the feedback control only for a predetermined period after the transmission circuitry is instructed to generate the first transmission pulse.

6. The ultrasonic diagnostic apparatus according to claim 5, wherein the predetermined period is set to be a time period that would be required for a duty cycle of the driving pulse signal to reach a target value from an initial value if the generation circuitry generated the driving pulse for the predetermined time period by the feedback control.

7. The ultrasonic diagnostic apparatus according to claim 4, wherein the generation circuitry is configured to generate the driving pulse signal having the predetermined duty cycle when a current value of the second output signal from the linear regulator reaches a threshold.

8. The ultrasonic diagnostic apparatus according to claim 1, wherein the regulator control circuitry is configured to increase the adjustment voltage value when the transmission circuitry drives the ultrasonic wave generating element with a transmission pulse for ShearWave in the first mode.

9. The ultrasonic diagnostic apparatus according to claim 1, wherein the regulator control circuitry is configured to increase the adjustment voltage value when the transmission circuitry drives the ultrasonic wave generating element with a transmission pulse for bursting bubbles included in a ultrasonic contrast agent in the first mode.

* * * * *